United States Patent
Woo et al.

(10) Patent No.: US 12,401,043 B2
(45) Date of Patent: *Aug. 26, 2025

(54) METHOD FOR FABRICATION OF LITHIUM METAL SECONDARY BATTERY COMPRISING LITHIUM ELECTRODE

(71) Applicant: LG ENERGY SOLUTION, LTD., Seoul (KR)

(72) Inventors: Kyung-Hwa Woo, Daejeon (KR); Jong-Keon Yoon, Daejeon (KR); Jae-Hyun Lee, Daejeon (KR); Hoe-Jin Hah, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/200,656

(22) Filed: May 23, 2023

(65) Prior Publication Data
US 2023/0299301 A1    Sep. 21, 2023

Related U.S. Application Data

(63) Continuation of application No. 16/615,046, filed as application No. PCT/KR2019/000504 on Jan. 11, 2019, now Pat. No. 11,699,793.

(30) Foreign Application Priority Data

Jan. 11, 2018  (KR) .................. 10-2018-0004029

(51) Int. Cl.
*H01M 4/62*    (2006.01)
*H01M 4/04*    (2006.01)
(Continued)

(52) U.S. Cl.
CPC ......... *H01M 4/628* (2013.01); *H01M 4/0402* (2013.01); *H01M 4/043* (2013.01);
(Continued)

(58) Field of Classification Search
CPC .... H01M 4/628; H01M 4/624; H01M 4/0402; H01M 4/0404; H01M 4/043;
(Continued)

(56) References Cited

U.S. PATENT DOCUMENTS 6,096,454 A    8/2000    Tran et al.
6,168,884 B1   1/2001    Neudecker et al.
(Continued)

FOREIGN PATENT DOCUMENTS

CN    1489229 A      4/2004
CN    104810557 A    7/2015
(Continued)

OTHER PUBLICATIONS

Extended European Search Report issued from the European Patent Office dated Oct. 20, 2020 in corresponding European patent application No. 19738294.8.
(Continued)

*Primary Examiner* — Raymond Alejandro
(74) *Attorney, Agent, or Firm* — Morgan, Lewis & Bockius LLP

(57) ABSTRACT

Disclosed is a method for manufacturing a lithium metal secondary battery including a lithium metal electrode as a negative electrode, wherein the lithium metal electrode has a protective layer formed thereon, and the lithium metal secondary battery is discharged before its initial charge during an activation step of the lithium metal secondary battery so that stripping occurs on the surface of the lithium metal electrode.

16 Claims, 2 Drawing Sheets

(51) Int. Cl.
*H01M 4/36* (2006.01)
*H01M 10/052* (2010.01)
*H01M 10/058* (2010.01)
*H01M 10/44* (2006.01)
*H01M 4/02* (2006.01)

(52) U.S. Cl.
CPC ......... *H01M 4/0447* (2013.01); *H01M 4/366* (2013.01); *H01M 10/052* (2013.01); *H01M 10/058* (2013.01); *H01M 10/446* (2013.01); *H01M 2004/028* (2013.01)

(58) Field of Classification Search
CPC .. H01M 4/0447; H01M 4/0445; H01M 4/044; H01M 4/366; H01M 4/362; H01M 10/052; H01M 10/058; H01M 10/446; H01M 2004/027; H01M 2004/028
See application file for complete search history.

(56) References Cited

U.S. PATENT DOCUMENTS

| | | | |
|---|---|---|---|
| 11,699,793 B2* | 7/2023 | Woo | H01M 4/628 29/623.3 |
| 2004/0072066 A1 | 4/2004 | Cho et al. | |
| 2014/0178777 A1 | 6/2014 | Lee et al. | |
| 2015/0295246 A1* | 10/2015 | Son | H01M 4/364 429/231.95 |
| 2016/0204476 A1 | 7/2016 | Kobayashi | |
| 2016/0372784 A1 | 12/2016 | Hayner et al. | |
| 2017/0104204 A1* | 4/2017 | Zhamu | H01M 10/054 |
| 2017/0141442 A1* | 5/2017 | Mikhaylik | H01M 10/058 |

FOREIGN PATENT DOCUMENTS

| | | | |
|---|---|---|---|
| CN | 105048015 | A | 11/2015 |
| CN | 107221649 | A | 9/2017 |
| JP | H08-050921 | A | 2/1996 |
| JP | H0855636 | A | 2/1996 |
| JP | H09-283184 | A | 10/1997 |
| JP | 2011-009202 | A | 1/2011 |
| KR | 10-0550981 | B1 | 2/2006 |
| KR | 10-0639431 | B1 | 10/2006 |
| KR | 10-2008-0036139 | A | 4/2008 |
| KR | 10-2014-0082074 | A | 7/2014 |
| KR | 10-2015-0030156 | A | 3/2015 |
| KR | 10-2016-0032245 | A | 3/2016 |
| KR | 10-2016-0052351 | A | 5/2016 |
| KR | 10-1621410 | B1 | 5/2016 |
| KR | 10-2017-0061866 | A | 6/2017 |

OTHER PUBLICATIONS

Mori et al., "Chemical properties of various organic electrolytes for lithium rechargeable batteries 1. Characterization of passivating layer formed on graphite in alkyl carbonate solutions," Journal of Power Sources, vol. 68, No. 1,(1997), pp. 59-64, XP004100197.
International Search Report issued in corresponding International Patent Application No. PCT/KR2019/000504, dated Apr. 12, 2019.
Suzuki, et al., "Electrochemical performance of an all-solid-state lithium-oxygen battery under humidified oxygen," Solid State Ionics, 2016, vol. 289, pp. 72-76.
The extended European search report issued in corresponding European Patent Application No. 24189721.4, dated Nov. 20, 2024.

* cited by examiner

METHOD FOR FABRICATION OF LITHIUM METAL SECONDARY BATTERY COMPRISING LITHIUM ELECTRODE

TECHNICAL FIELD

The present disclosure relates to a method for manufacturing a lithium metal secondary battery including a lithium electrode. More particularly, the present disclosure relates to a method for manufacturing a lithium metal secondary battery including a lithium electrode which can improve cycle characteristics of a battery by carrying out discharge first, instead of charge, during an activation step of a lithium metal secondary battery including a lithium metal electrode having a protective layer formed thereon.

The present application is a continuation application of U.S. patent application Ser. No. 16/615,046, filed on Nov. 19, 2019, which claims priority to Korean Patent Application No. 10-2018-0004029 filed on Jan. 11, 2018 in the Republic of Korea, the disclosures of which including the specification and drawings are incorporated herein by reference.

BACKGROUND ART

As electric, electronic, communication and computer industries have been developed rapidly, batteries having high capacity have been increasingly in demand. To meet such demand, lithium metal secondary batteries using lithium metal or a lithium alloy as a negative electrode having high energy density have been given many attentions.

A lithium metal secondary battery refers to a secondary battery using lithium metal or a lithium alloy as a negative electrode. Lithium metal has a low density of 0.54 g/cm3 and a significantly low standard reduction potential of −3.045 V (SHE: based on the standard hydrogen electrode), and thus has been most spotlighted as an electrode material for a high-energy density battery.

In the case of such a lithium metal secondary battery, it is charged while lithium metal is plated on the negative electrode and is discharged while lithium metal is stripped, unlike the conventional lithium ion secondary batteries. Since lithium dendrite plating is increased so that the electrode undergoes an increase in surface area during charge and thus side reaction with an electrolyte is increased, a technology of applying a protective layer onto a lithium metal electrode has been introduced. Such a protective layer is effective for inhibiting the reaction of lithium metal with the electrolyte. However, when lithium metal oxide is applied to the positive electrode, lithium metal is plated on the protective layer of the lithium metal electrode, since initial operation of the battery starts from charge. FIG. 1 is a schematic view illustrating a lithium metal electrode subjected to the conventional activation step. When the battery is operated initially from charge, lithium metal is plated onto the protective layer 20 to generate byproducts 30 undesirably. In order for the protective layer to function as a protective layer, it is required that lithium metal is plated between the protective layer and the lithium metal electrode.

DISCLOSURE

Technical Problem

The present disclosure is designed to solve the problems of the related art, and therefore the present disclosure is directed to providing a method for manufacturing a lithium metal electrode battery including a lithium electrode which can improve cycle characteristics of a battery by carrying out discharge first, instead of charge, during an activation step of a lithium metal secondary battery including a lithium electrode having a protective layer formed thereon.

Technical Solution

In one aspect of the present disclosure, there is provided a method for manufacturing a lithium metal secondary battery according to any one of the following embodiments.

According to the first embodiment, there is provided a method for manufacturing a lithium metal secondary battery including a lithium metal electrode as a negative electrode, wherein the lithium metal electrode has a protective layer formed thereon, and the lithium metal secondary battery is discharged before its initial charge during an activation step of the lithium metal secondary battery so that stripping occurs on the surface of the lithium metal electrode.

According to the second embodiment, there is provided the method for manufacturing a lithium metal secondary battery as defined in the first embodiment, wherein the protective layer prevents chemical reaction between an electrolyte and the lithium metal electrode.

According to the third embodiment, there is provided the method for manufacturing a lithium metal secondary battery as defined in the first or the second embodiment, wherein the protective layer includes an organic material and/or an inorganic material.

According to the fourth embodiment, there is provided the method for manufacturing a lithium metal secondary battery as defined in the third embodiment, wherein the organic material includes a fluorinated polymer.

According to the fifth embodiment, there is provided the method for manufacturing a lithium metal secondary battery as defined in the fourth embodiment, wherein the fluorinated polymer includes a copolymer of a vinylidene fluoride-derived monomer with a hexafluoroproyplene-derived monomer, trifluoroethylene-derived monomer, tetrafluoroethylene-derived monomer or a combination thereof.

According to the sixth embodiment, there is provided the method for manufacturing a lithium metal secondary battery as defined in any one of the third to the fifth embodiments, wherein the inorganic material includes lithium fluoride (LiF), carbon, alumina ($Al_2O_3$), $BaTiO_3$, lithium lanthanum titanate (LLTO), lithium lanthanum zirconium oxide (LLZO), lithium super ionic conductor (LISICON), lithium aluminum titanium phosphate (LATP), lithium aluminum germanium phosphate (LAGP), or a combination thereof.

According to the seventh embodiment, there is provided the method for manufacturing a lithium metal secondary battery as defined in any one of the first to the sixth embodiments, wherein the protective layer is formed by deposition, coating, pressing, lamination or attachment.

According to the eighth embodiment, there is provided the method for manufacturing a lithium metal secondary battery as defined in any one of the first to the seventh embodiments, wherein the discharge current density is 0.01-3 $mA/cm^2$ during the discharge.

According to the ninth embodiment, there is provided the method for manufacturing a lithium metal secondary battery as defined in any one of the first to the eighth embodiments, wherein the discharge current density is 1-2 $mA/cm^2$ during the discharge.

According to the tenth embodiment, there is provided the method for manufacturing a lithium metal secondary battery as defined in any one of the first to the ninth embodiments, wherein the discharge capacity during the discharge is determined by considering the amount of lithium that can be accepted by the positive electrode.

According to the eleventh embodiment, there is provided the method for manufacturing a lithium metal secondary battery as defined in any one of the first to the tenth embodiments, wherein the positive electrode active material contained in the positive electrode of the lithium metal secondary battery is any one selected from lithium metal oxide, lithium-free metal oxide or combinations thereof.

According to the twelfth embodiment, there is provided the method for manufacturing a lithium metal secondary battery as defined in the eleventh embodiment, wherein the lithium-free metal oxide is any one selected from vanadium oxide, manganese oxide, nickel oxide, cobalt oxide, niobium oxide, iron phosphate or combinations thereof.

According to the thirteenth embodiment, there is provided the method for manufacturing a lithium metal secondary battery as defined in any one of the first to the twelfth embodiments, wherein the starting current density of the initial charge is 0.01-2 $mA/cm^2$.

Advantageous Effects

According to the present disclosure, a lithium metal secondary battery including a lithium electrode is not charged but discharged first in the activation step thereof. Thus, it is possible to alleviate an over-voltage at the initial stage of charge, to minimize deformation of the lithium electrode protective layer, and thus to improve cycle characteristics of the battery.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Figure 1:
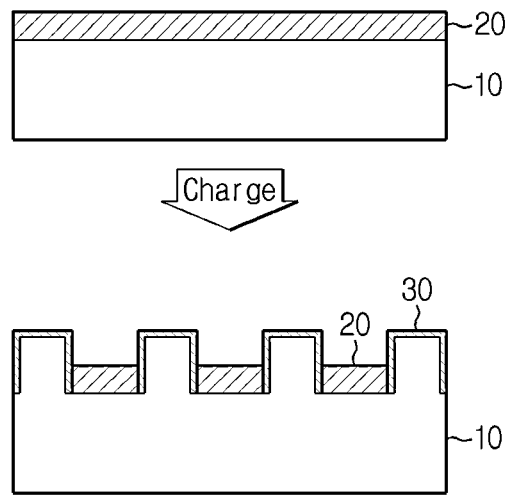
FIG. 1 is a schematic view illustrating a lithium metal electrode subjected to the conventional activation step.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Throughout the specification, the expression 'a part ⌜includes⌟ an element' does not preclude the presence of any additional elements but means that the part may further include the other elements.

In addition, it will be understood that the terms 'comprises' and/or 'comprising', or 'includes' and/or 'including' when used in this specification, refer to the presence of any stated shapes, numbers, steps, operations, members, elements and/or groups thereof, but do not preclude the addition of one or more other shapes, numbers, steps, operations, members, elements and/or groups thereof.

As used herein, the terms 'approximately', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure including an accurate or absolute numerical value provided to help understanding of the present disclosure.

As used herein, the term 'combinations thereof' included in any Markush-type expression means a combination or mixture of one or more elements selected from the group of elements disclosed in the Markush-type expression, and refers to the presence of one or more elements selected from the group.

As used herein, the expression 'A and/or B' means 'A, B or both of them'.

The method for manufacturing a lithium metal secondary battery according to an embodiment of the present disclosure includes allowing a lithium metal secondary battery to be discharged before the initial charge during the activation step thereof so that stripping occurs on the surface of the lithium metal electrode. The lithium metal secondary battery includes: a lithium metal electrode including lithium metal as a negative electrode active material; and a protective layer formed on the lithium metal electrode.

Referring to the conventional process for manufacturing a secondary battery, slurry containing each of a positive electrode active material and a negative electrode active material is applied to each current collector first, and then the coated electrodes are wound or stacked with a separator functioning as an insulator to prepare or provide an electrode assembly. Then, the electrode assembly is introduced to a battery casing.

After that, a step of injecting an electrolyte to the battery casing is carried out and required post-steps, such as sealing, are performed. Then, an aging step for impregnation with an electrolyte is carried out by exposing the secondary battery to a predetermined temperature and humidity so that the electrolyte ingredients of the secondary battery may be incorporated or infiltrated to the secondary battery.

After the completion of the above-mentioned steps, a formation step is carried out by charging/discharging the secondary battery.

The formation step may include an activation step of charging/discharging the battery; a degassing step; a step of detecting defected batteries, or the like.

According to the present disclosure, the activation step is modified among the above-mentioned steps in such a manner that discharge is carried out first before the initial charge so that stripping occurs on the surface of the lithium metal electrode.

When the initial charge is carried out first during the activation step, lithium metal is plated on the protective layer formed on the lithium metal electrode. Therefore, side reaction occurs between the plated lithium metal and an electrolyte, resulting in degradation of cycle characteristics of the battery.

Figure 2:
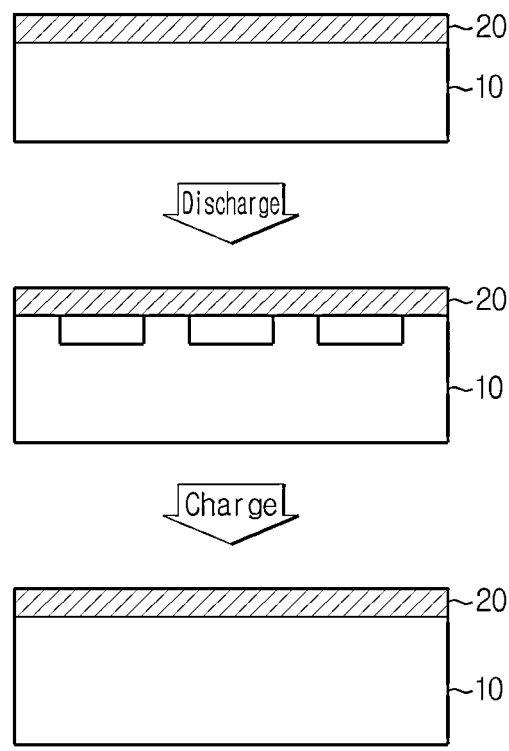
FIG. 2 is a schematic view illustrating a lithium metal electrode subjected to the activation step according to an embodiment of the present disclosure.

FIG. 2 is a schematic view illustrating a lithium metal electrode subjected to the activation step according to the present disclosure. Referring to FIG. 2, discharge is carried out first before the initial charge is carried out, according to the present disclosure, and thus stripping occurs on the surface of the lithium metal electrode 10 while the protective layer 20 formed on the lithium metal electrode 10 is maintained as it is. Then, charge is carried out so that lithium metal is plated on the portion where stripping occurs on the surface of the lithium metal electrode 10. Therefore, it is possible to prevent lithium metal from being exposed to the outside of the protective layer 20, and thus to inhibit deformation of the protective layer 20 and to suppress generation of side-reaction with an electrolyte. As a result, it is possible to alleviate an over-voltage at the initial stage of charge and to improve cycle characteristics of the battery.

Meanwhile, the protective layer according to the present disclosure functions to prevent chemical reaction between an electrolyte and the lithium metal electrode and may include an organic material and/or an inorganic material.

According to an embodiment of the present disclosure, the organic material may include a fluorinated polymer.

For example, the fluorinated polymer may include a vinylidene fluoride-derived monomer. In addition, the fluorinated polymer may be a copolymer of a vinylidene fluoride-derived monomer with a hexafluoroproyplene-derived monomer, trifluoroethylene-derived monomer, tetrafluoroethylene-derived monomer or a combination thereof.

Particularly, it is preferred that the protective layer includes polyvinylidene fluoride-co-hexafluoropropylene in terms of processability and stability. Particularly, polyvinylidene fluoride-co-hexafluoropropylene shows high solubility to a solvent and allows formation of a thin film, and thus can ensure high strength even in the case of a thin film.

According to an embodiment of the present disclosure, the organic material may be the fluorinated polymer alone, or may include the fluorinated polymer, polyethylene oxide, polyacrylonitrile, polymethyl methacrylate or a combination of two or more them.

According to an embodiment of the present disclosure, the inorganic material includes lithium fluoride (LiF), carbon, alumina ($Al_2O_3$), $BaTiO_3$, lithium lanthanum titanate (LLTO), lithium lanthanum zirconium oxide (LLZO), lithium super ionic conductor (LISICON), lithium aluminum titanium phosphate (LATP), lithium aluminum germanium phosphate (LAGP), or a combination thereof.

Particularly, when lithium fluoride is used as a protective layer, it is possible to prevent reaction of an electrolyte with lithium metal effectively by virtue of low reactivity of lithium fluoride.

According to an embodiment of the present disclosure, the protective layer may be formed by deposition, coating, pressing, lamination or attachment, but is not limited thereto.

For example, the protective layer may be formed by electrodeposition or chemical vapor deposition of lithium fluoride on the lithium metal electrode.

In addition, the protective layer may be formed by coating the lithium metal electrode with the organic or inorganic material, followed by drying.

In a variant, the protective layer may be obtained by preparing a protective layer separately, and carrying out physical lamination, pressing or binding of the protective layer on the lithium metal electrode.

Herein, the protective layer may have a thickness of 0.1-10 μm, suitably. Within the above-defined range, it is possible to accomplish desired effects of the present disclosure. According to an embodiment of the present disclosure, the protective layer may have a thickness of 0.2 μm or more, 0.5 μm or more, or 1 μm or more, within the above-defined range. In addition, the protective layer may have a thickness of 7 μm or less, 6 μm or less, or 5 μm or less, within the above-defined range. For example, the protective layer may have a thickness of 0.2-5 μm in terms of resistance. According to an embodiment of the present disclosure, the discharge current density may be 0.1-3 $mA/cm^2$ during the discharge. Within the above-defined range, it is possible to accomplish desired effects of the present disclosure. The discharge current density during the discharge may be 0.05 $mA/cm^2$ or more, 0.1 $mA/cm^2$ or more, or 1 $mA/cm^2$ or more, within the above-defined range. In addition, the discharge current density during the discharge may be 3 $mA/cm^2$ or less, 2.5 $mA/cm^2$ or less, or 2 $mA/cm^2$ or less, within the above-defined range. For example, the discharge current density during the discharge may be 0.05-2.5 $mA/cm^2$, 0.1-2 $mA/cm^2$, or 1-2 $mA/cm^2$, considering that localization of current density may reduce generation of homogeneous lithium stripping caused by discharge.

Further, the discharge capacity during the discharge may be determined by considering the amount of lithium that can be accepted by the positive electrode.

According to the present disclosure, the starting current density of the initial charge may be 0.01-2 $mA/cm^2$. Within the above-defined range, it is possible to accomplish desired effects of the present disclosure. The starting current density of the initial charge may be 0.05 $mA/cm^2$ or more, or 0.1 $mA/cm^2$ or more, within the above-defined range. In addition, the starting current density of the initial charge may be 2 $mA/cm^2$ or less, 1.5 $mA/cm^2$ or less, or 1 $mA/cm^2$ or less, within the above-defined range. For example, the starting current density of the initial charge may be 0.01-2 $mA/cm^2$, 0.05-1.5 $mA/cm^2$, or 0.1-1 $mA/cm^2$, considering that localization of current density may reduce non-homogeneous reaction.

Meanwhile, the positive electrode according to the present disclosure is obtained by applying an electrode mixture containing a mixture of a positive electrode active material, a conductive material and a binder onto a positive electrode current collector, followed by drying. If desired, the mixture may further include a filler.

The positive electrode current collector is formed to have a thickness of 3-500 μm. The positive electrode current collector is not particularly limited, as long as it causes no chemical change in the corresponding battery and has high conductivity. Particular examples of the positive electrode current collector may include stainless steel; aluminum; nickel; titanium; baked carbon; aluminum or stainless steel surface-treated with carbon, nickel, titanium or silver; or the like. It is possible to increase the adhesion of a positive electrode active material by forming fine surface irregularities on the surface of a current collector. The positive electrode current collector may have various shapes, such as a film, sheet, foil, net, porous body, foam and a non-woven web body.

The conductive material is added generally in an amount of 1-50 wt % based on the total weight of the mixture including the positive electrode active material. The conductive material is not particularly limited, as long as it causes no chemical change in the corresponding battery and has conductivity. Particular examples of the conductive material include: graphite, such as natural graphite or artificial graphite; carbon black, such as acetylene black, Ketjen black, channel black, furnace black, lamp black or thermal black; conductive fibers, such as carbon fibers or metallic fibers; conductive tubes, such as carbon nanotubes; metal powder, such as fluorocarbon, aluminum or nickel powder; conductive whisker, such as zinc oxide or potassium titanate; conductive metal oxide, such as titanium oxide; or conductive materials, such as polyphenylene derivatives.

The binder is an ingredient which assists binding between the electrode active material and the conductive material and binding to the current collector. In general, the binder is added in an amount of 1-50 wt % based on the total weight of the mixture including the positive electrode active material. Particular examples of the binder include polyvinylidene fluoride, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene terpolymer (EPDM), sulfonated EPDM, styrene butyrene rubber, fluororubber, various copolymers, or the like.

The filler is an ingredient inhibiting swelling of the positive electrode and is used optionally. The filler is not particularly limited, as long as it causes no chemical change in the corresponding battery and is a fibrous material. Particular examples of the filler include olefinic polymers, such as polyethylene or polypropylene; and fibrous materials, such as glass fibers or carbon fibers.

The positive electrode active material according to the present disclosure may be any one selected from lithium metal oxide, lithium-free metal oxide and combinations thereof. Lithium metal oxide, used currently as a positive electrode active material, allows initial discharge. However, it is possible to incorporate lithium-free metal oxide, which is cost-efficient and ensures safety, partially to the positive electrode, or to apply 100% of lithium-free metal oxide to the positive electrode.

Herein, lithium-free metal oxide may include vanadium oxide, manganese oxide, nickel oxide, cobalt oxide, niobium oxide, iron phosphate, or the like.

According to the present disclosure, the negative electrode may be obtained by attaching lithium metal to a negative electrode current collector. According to an embodiment of the present disclosure, the negative electrode may be obtained through deposition, coating, pressing, lamination or attachment of metal foil onto the negative electrode current collector. In general, the negative electrode current collector is formed to have a thickness of 3-500 μm. The negative electrode current collector is not particularly limited, as long as it causes no chemical change in the corresponding battery and has conductivity. Particular examples of the negative electrode current collector may include copper; stainless steel; aluminum; nickel; titanium; baked carbon; copper or stainless steel surface-treated with carbon, nickel, titanium or silver; aluminum-cadmium alloy; or the like. Similarly to the positive electrode current collector, it is possible to increase the adhesion of a negative electrode active material by forming fine surface irregularities on the surface of a current collector. The negative electrode current collector may have various shapes, such as a film, sheet, foil, net, porous body, foam and a non-woven web body.

In addition, according to the present disclosure, the lithium metal electrode includes a protective layer formed thereon.

The protective layer may be disposed on the lithium negative electrode by the above-mentioned methods.

For example, the protective layer may be formed by deposition, coating, pressing, lamination or attachment, but is not limited thereto.

Particularly, the deposition may be carried out by physical vapor deposition (PVD), thermal evaporation, E-beam evaporation or sputtering.

Particularly, when the protective layer includes a fluorinated polymer as an organic material, it may be formed by dissolving the organic material in a solvent and applying the resultant solution onto the negative electrode active material layer, followed by drying.

Particularly, when the protective layer includes an inorganic material, it may be formed by dispersing or dissolving the inorganic material in a solvent and applying the resultant dispersion or solution onto the negative electrode active material layer, followed by drying.

Figure 3:
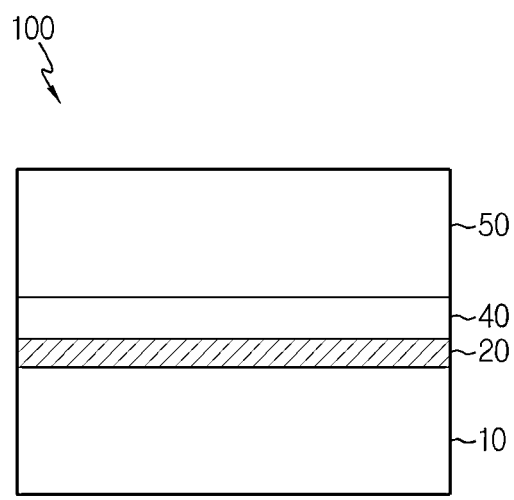
FIG. 3 is a schematic view illustrating the lithium metal secondary battery according to an embodiment of the present disclosure.

As shown in FIG. 3, the lithium metal secondary battery according to the present disclosure may include: a lithium metal electrode 10 including a negative electrode current collector, and lithium metal formed as a negative electrode active material on the negative electrode current collector; a protective layer 20 formed on the lithium metal electrode; a separator 40 formed on the protective layer; and a positive electrode 50 formed on the separator. The negative electrode may include lithium metal alone without any separate negative electrode current collector.

Meanwhile, the separator used in the lithium metal secondary battery according to the present disclosure is an insulating thin film interposed between the positive electrode and the negative electrode and having high ion permeability and mechanical strength.

The separator may include a porous polymer substrate. Any porous polymer substrate may be used, as long as it is used conventionally for a lithium secondary battery. Particular examples of the porous polymer substrate may include a polyolefin-based porous membrane or nonwoven web, but are not limited thereto.

Particular examples of the polyolefin-based porous membrane include a membrane formed of a polyolefin-based polymer, such as polyethylene (e.g. high density polyethylene, linear low density polyethylene, low density polyethylene or ultrahigh molecular weight polyethylene), polypropylene, polybutyelene or polypentene, alone or in combination.

In addition to the polyolefin-based nonwoven web, particular examples of the nonwoven web include a nonwoven web formed of a polymer including polyethylene terephthalate, polybutylene terephthalate, polyester, polyacetal, polyamide, polycarbonate, polyimide, polyetheretherketone, polyethersulfone, polyphenylene oxide, polyphenylene sulfide or polyethylene naphthalene, alone or in combination. The structure of the nonwoven web may be a spunbond nonwoven web or melt blown nonwoven web including long fibers.

Although there is no particular limitation in thickness of the porous substrate, the porous substrate may have a thickness of 5-50 μm, 3-300 μm, or 5-500 μm.

In addition, the porosity and the size of pores present in the porous substrate are not particularly limited. However, the pore size and porosity may be 0.001-50 μm and 10-95%, respectively.

In addition, the electrolyte salt contained in the non-aqueous electrolyte that may be used in the present disclosure is a lithium salt. Any lithium salt used conventionally for an electrolyte for a lithium secondary battery may be used without particular limitation. For example, the anion of the lithium salt may be any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, or combinations thereof.

Particular examples of the organic solvent that may be contained in the non-aqueous electrolyte may include those used conventionally for an electrolyte for a lithium secondary battery with no particular limitation. For example, it is possible to use ethers, esters, amides, linear carbonates or cyclic carbonates, alone or in combination.

Typical examples of the organic solvent may include carbonate compounds, such as cyclic carbonates, linear carbonates or mixtures thereof.

Particular examples of the cyclic carbonate compounds include any one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, halides thereof, or combinations thereof. Particular examples of such halides include fluoroethylene carbonate (FEC) but are not limited thereto.

In addition, particular examples of the linear carbonate compounds include any one selected from the group consisting of dimethyl carbonate (DMC), diethyl carbonate (DEC), dipropyl carbonate, ethyl methyl carbonate (EMC), methyl propyl carbonate, ethyl propyl carbonate or combinations thereof, but are not limited thereto.

Particularly, ethylene carbonate and propylene carbonate, which are cyclic carbonates among the carbonate organic solvents, have a high dielectric constant and dissociate the lithium salt in an electrolyte well. In addition, it is possible to prepare an electrolyte having high electroconductivity, when using such cyclic carbonates in combination with low-viscosity low-dielectric constant linear carbonates, such as dimethyl carbonate or diethyl carbonate, at an adequate ratio.

Further, among the organic solvents, particular examples of the ethers may include any one selected from the group consisting of dimethyl ether, diethyl ether, dipropyl ether, methyl ethyl ether, methyl propyl ether, ethyl propyl ether, or combinations thereof, but are not limited thereto.

Among the organic solvents, particular examples of the esters include any one selected from the group consisting of methyl acetate, ethyl acetate, propyl acetate, methyl propionate, ethyl propionate, γ-butyrolactone, γ-valerolactone, γ-caprolactone, σ-valerolactone, caprolactone or combinations thereof, but are not limited thereto.

Injection of the electrolyte may be carried out in an adequate step during the process for manufacturing a lithium secondary battery depending on the manufacturing process of a final product and properties required for a final product. In other words, injection of the electrolyte may be carried out before the assemblage of a lithium secondary battery or in the final step of the assemblage of a lithium secondary battery.

The lithium secondary battery according to the present disclosure may be subjected to a lamination or stacking step of a separator with electrodes and a folding step, in addition to the conventional winding step. In addition, the battery casing may be a metallic can, or a pouch-type battery casing made of a laminate sheet including a resin layer and a metal layer. Particularly, the battery casing may be a pouch-type battery casing. As described above, it is difficult for a pouch-type battery casing to retain the outer shape of a battery under constant force. Thus, as the non-activated region, which is not activated during the activation step, is activated continuously while cycles proceed at a high voltage, gas generation occurs. Then, the pouch is swelled and bent due to the generated gas or the gas is trapped between the electrodes so that the gas interrupts transport of lithium ions, thereby interrupting smooth and homogeneous reaction in the electrodes undesirably. Therefore, in this case, application of the method for manufacturing a secondary battery according to the present disclosure can realize a higher effect.

Then, after the non-aqueous electrolyte is injected to the battery casing in which the electrode assembly is received and the preliminary battery is sealed, the preliminary battery is subjected to an activation step of carrying out initial charge in order to activate the electrode active material and to form a solid electrolyte interface (SEI) film on the electrode surface. In addition, an aging step may be further carried out in order to allow sufficient infiltration of the electrolyte injected before the activation step into the electrode and separator.

As described above, the initial charge is initiated after discharge is performed in the activation step according to the present disclosure.

Meanwhile, in another aspect of the present disclosure, there are provided a lithium metal secondary battery obtained by the above-described method, a battery module including the lithium metal secondary battery as a unit cell, a battery pack including the battery module, and a device including the battery pack as an electric power source. Herein, particular examples of the device may include, but are not limited to:

power tools driven by an electric motor; electric cars, including electric vehicles, hybrid electric vehicles, plug-in hybrid electric vehicles, or the like; electric carts, including electric bikes and electric scooters; electric golf carts; electric power storage systems; or the like.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example 1

(1) Manufacture of Positive Electrode

First, 96 parts by weight of $LiNi_{1/3}Mn_{1/3}Co_{1/3}O_2$ as a positive electrode active material, 2 parts by weight of Ketjen black as a conductive material and 2 parts by weight of polyvinylidene fluoride (PVDF) as a binder were added to N-methyl-2-pyrrolidone (NMP) as a solvent to prepare positive electrode active material slurry. Next, the positive electrode active material slurry was coated on one surface of an aluminum current collector to a thickness of 65 μm, followed by drying, pressing and punching into a predetermine size, thereby providing a positive electrode.

(2) Manufacture of Negative Electrode Including Lithium Metal Electrode Having Protective Layer Formed Thereon Lithium Metal Foil Having a Thickness of 20 μm was Laminated with One Surface of a copper current collector, and pressing was carried out with a roll press. Next, polyvinylidene fluoride-co-hexafluoropropylene (PVDF-co-HFP) was dissolved in N-methyl-2-pyrrolidone as a solvent at a concentration of 5 wt % to prepare a solution for forming a protective layer. Then, the solution for forming a protective layer was coated on the lithium metal foil and dried at a temperature of 80° C. for 24 hours to form a protective layer with a thickness of 0.5 μm on the lithium metal foil.

(3) Manufacture of Lithium Secondary Battery

A separator (polypropylene-based porous polymer substrate) was interposed between the positive electrode and the lithium metal electrode having a protective layer thereon to obtain a coin cell.

Particularly, the separator was interposed between the positive electrode and the protective layer.

Then, an electrolyte including 1M $LiPF_6$ dissolved in a solvent containing ethylene carbonate (EC) mixed with ethyl methyl carbonate (EMC) at a volume ratio of 30:70 was injected to the coin cell. Then, the coin cell was discharged under the condition as shown in the following Table 1 during its activation step, and then initial charge (constant current/constant voltage (CC/CV), starting current density 1.2 $mA/cm^2$, 4.25V cut off) was carried out to obtain a lithium metal secondary battery.

Examples 2-12

Lithium metal secondary batteries were obtained in the same manner as Example 1, except that the discharge condition during its activation step was modified as shown in Table 1.

Comparative Example

A lithium metal secondary battery was obtained in the same manner as Example 1, except that the discharge step is not carried out before the initial charge in the activation step.

Determination of Capacity Maintenance of Lithium Metal Secondary Battery

Each of the lithium metal secondary batteries according to Examples 1-12 and Comparative Example was charged to 4.25V at 0.3 C under a constant current/constant voltage (CC/CV) condition at 45° C., discharged to 3V at 0.5 C under a constant current (CC) condition, and then determined for the discharge capacity. The charge/discharge cycle was repeated 50 times. The capacity maintenance determined after 50 cycles is shown in Table 1.

TABLE 1

| | Activation condition | | | Capacity maintenance (%) after 50 cycles |
|---|---|---|---|---|
| | Discharge current density ($mA/cm^2$) | Discharge capacity (mAh) | Initial charge capacity (mAh) | |
| Example 1 | 0.1 | 0.1 | 2.1 | 68 |
| Example 2 | | 1 | 3 | 70 |
| Example 3 | 0.5 | 0.1 | 2.1 | 71 |
| Example 4 | | 1 | 3 | 75 |
| Example 5 | 1 | 0.1 | 2.1 | 79 |
| Example 6 | | 1 | 3 | 86 |
| Example 7 | 2 | 0.1 | 2.1 | 75 |
| Example 8 | | 1 | 3 | 80 |
| Example 9 | 0.01 | 0.1 | 2.1 | 66 |
| Example 10 | | 1 | 3 | 69 |
| Example 11 | 3 | 0.1 | 2.1 | 68 |
| Example 12 | | 1 | 3 | 70 |
| Comp. Ex. | — | — | 2 | 59 |

As shown in Table 1, each lithium metal secondary battery according to Examples show a significantly higher capacity maintenance as compared to Comparative Example. It is thought that since discharge is carried out before the initial charge in the activation step, it is possible to alleviate an over-voltage at the initial stage of charge, and thus to minimize deformation of the lithium electrode protective layer, thereby providing improved cycle characteristics.

It should be understood that the detailed description are given by way of illustration only and various changes and modifications may be made without departing from the scope of the invention as defined in the following claims. Therefore, the embodiments disclosed herein are not intended to limit the scope of the present disclosure but are for illustrative purposes only, and the scope of the present disclosure is not limited thereto. It should be also understood that the scope of the present disclosure is defined by the following claims and all equivalents thereof are also included in the scope of the present disclosure.

DESCRIPTION OF DRAWING NUMERALS

10: Lithium metal electrode
20: Protective layer
30: Byproducts
40: Separator
50: Positive electrode
100: Lithium metal secondary battery

What is claimed is:

1. A method of preventing a chemical reaction between an electrolyte and a lithium metal negative electrode of a lithium metal secondary battery, comprising:
   preparing the lithium metal secondary battery including: the lithium metal negative electrode; a positive electrode including a lithium metal oxide, a lithium-free metal oxide or combinations thereof; a protective layer disposed on the lithium metal negative electrode; a separator interposed between the positive electrode and the protective layer;
   injecting an electrode into a cell in which the lithium metal secondary battery is included;
   discharging the lithium metal secondary battery before an initial charging during an activation step of the lithium metal secondary battery; and
   stripping a surface of the lithium metal negative electrode during the discharging the lithium metal secondary battery.

2. The method according to claim 1, wherein the protective layer comprises an organic material.

3. The method according to claim 1, wherein the protective layer comprises an inorganic material.

4. The method according to claim 2, wherein the organic material comprises a fluorinated polymer.

5. The method according to claim 4, wherein the fluorinated polymer comprises a copolymer of a vinylidene fluoride-derived monomer with a hexafluoropropylene-derived monomer, a trifluoroethylene-derived monomer, a tetrafluoroethylene-derived monomer or combinations thereof.

6. The method according to claim 3, wherein the inorganic material comprises one chosen from lithium fluoride (LiF), carbon, alumina ($Al_2O_3$), $BaTiO_3$, lithium lanthanum titanate (LLTO), lithium lanthanum zirconium oxide (LLZO), a lithium super ionic conductor (LISICON), lithium aluminum titanium phosphate (LATP), lithium aluminum germanium phosphate (LAGP), and combinations thereof.

7. The method according to claim 1, wherein the protective layer is formed by deposition, coating, pressing, lamination or attachment.

8. The method according to claim 1, wherein a discharge current density during the discharge is 0.01-3 $mA/cm^2$.

9. The method according to claim 1, wherein a discharge current density during the discharge is 1-2 $mA/cm^2$.

10. The method according to claim 1, wherein a discharge capacity during the discharge is determined by an amount of lithium that can be accepted by the positive electrode.

11. The method according to claim 1, wherein the positive electrode comprises at least one selected from the group consisting of lithium metal oxide, lithium-free metal oxide and combinations thereof.

12. The method according to claim 11, wherein the lithium-free metal oxide comprises at least one selected from the group consisting of vanadium oxide, manganese oxide, nickel oxide, cobalt oxide, niobium oxide, iron phosphate and combinations thereof.

13. The method according to claim 1, wherein a starting current density of the initial charge is 0.01-2 $mA/cm^2$.

14. The method according to claim 1, wherein the lithium metal negative electrode includes: a current collector and a lithium metal disposed on the current collector.

15. The method according to claim 14, wherein the negative electrode current collector includes at least one selected from the group consisting of copper; stainless steel; aluminum; nickel; titanium; baked carbon; copper or stainless steel surface-treated with carbon, nickel, titanium or silver; aluminum-cadmium alloy; and combinations thereof.

16. The method according to claim 1, wherein the stripping occurs only on the surface of the lithium metal negative electrode during the discharging the lithium metal secondary battery.

* * * * *